(12) United States Patent
Pieciak, Jr. et al.

(10) Patent No.: US 8,616,816 B2
(45) Date of Patent: Dec. 31, 2013

(54) SCREW FOR COMPOSITE/PLASTIC MATERIALS

(75) Inventors: Joseph A. Pieciak, Jr., West Springfield, MA (US); Richard Belinda, Westfield, MA (US); Peter Barenski, Jr., Stockbridge, MA (US); Tad A. Weiss, Westhampton, MA (US)

(73) Assignee: Handy & Harman, White Plains, NY (US)

( * ) Notice: Subject to any disclaimer, the term of this patent is extended or adjusted under 35 U.S.C. 154(b) by 852 days.

(21) Appl. No.: 12/384,269

(22) Filed: Apr. 2, 2009

(65) Prior Publication Data

US 2009/0245973 A1 Oct. 1, 2009

Related U.S. Application Data

(63) Continuation-in-part of application No. 11/973,906, filed on Oct. 11, 2007, now Pat. No. 7,988,396.

(51) Int. Cl.
*F16B 25/00* (2006.01)

(52) U.S. Cl.
USPC .................. 411/411; 411/424; 411/387.2

(58) Field of Classification Search
USPC .......... 411/386–387.7, 399, 417, 311, 424
See application file for complete search history.

(56) References Cited

U.S. PATENT DOCUMENTS

| | | | | |
|---|---|---|---|---|
| 877,131 A | * | 1/1908 | Searelle | 411/399 |
| 2,024,071 A | * | 12/1935 | Taylor et al. | 411/424 |
| 4,697,969 A | * | 10/1987 | Sparkes | 411/387.7 |
| 4,808,051 A | * | 2/1989 | Gietl | 411/378 |
| 5,895,187 A | * | 4/1999 | Kuo-Tai | 411/386 |
| 6,086,303 A | * | 7/2000 | Fluckiger | 411/399 |
| 6,616,391 B1 | * | 9/2003 | Druschel | 411/387.2 |
| 6,666,638 B2 | | 12/2003 | Craven | |
| 6,941,635 B2 | | 9/2005 | Craven | |
| 7,189,045 B2 | | 3/2007 | McGovern et al. | |
| 7,293,947 B2 | | 11/2007 | Craven | |
| 7,367,768 B2 | | 5/2008 | McGovern et al. | |
| 2004/0228705 A1 | | 11/2004 | Baer et al. | |

FOREIGN PATENT DOCUMENTS

EP 1 207 312 A2 5/2002

* cited by examiner

*Primary Examiner* — Flemming Saether
(74) *Attorney, Agent, or Firm* — Alix, Yale & Ristas, LLP

(57) ABSTRACT

A fastener for composite or plastic material having a dense composition employs a head which has a socket and a recessed underside and a lower rim. In one embodiment, the shank has an upper portion with an enlarged diameter and a left hand thread while the lower portion has a tri-lobed configuration and is traversed by a right hand thread. The right hand thread may have a plurality of notches which, in one embodiment, are arranged in a spiral array. One embodiment of a fastener has longitudinally spaced rings which project from an enlarged diameter portion of the shank. The lower portion of the shank has a thread with a plurality of notches. The rings have a major diameter and spacing greater than the major diameter and spacing of the thread.

13 Claims, 15 Drawing Sheets

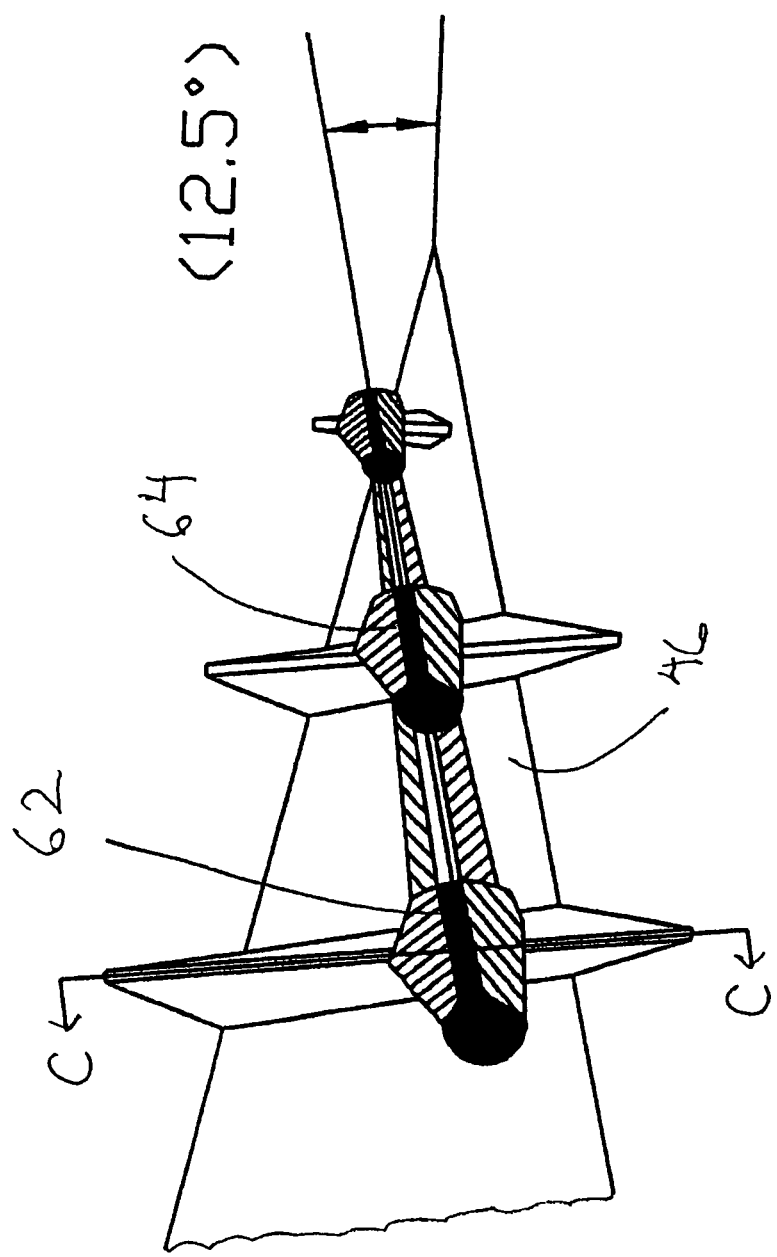

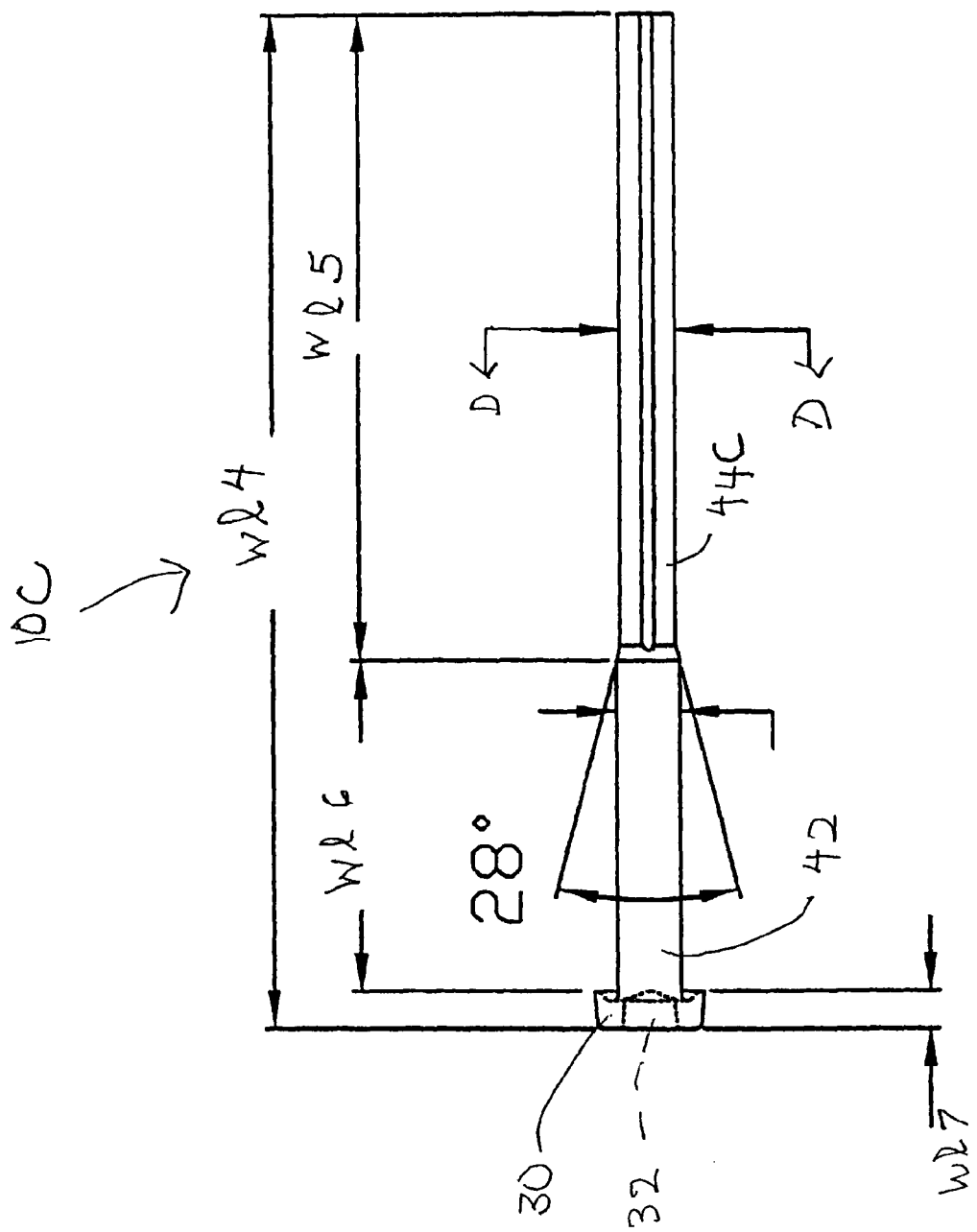

SCREW FOR COMPOSITE/PLASTIC MATERIALS

CROSS-REFERENCE TO RELATED APPLICATION

This application is a continuation-in-part of U.S. patent application Ser. No. 11/973,906 filed Oct. 11, 2007 now U.S. Pat. No. 7,988,396.

BACKGROUND OF THE TECHNOLOGY

This technology relates to fasteners which are employed for fastening composite and plastic materials to a support structure. More particularly, the fasteners relate to deck screws employed for securing dense composite and plastic materials.

Numerous fasteners have been advanced for fastening deck members which are composed of composite material. Several of these such deck fasteners are directed to eliminating the volcanoing or mushrooming effect. As the technology of composite materials has advanced, the denseness of the composite members has increased. The increased denseness has had a significant impact on the effectiveness of conventional deck screws. Accordingly, many deck screws which were adapted to perform in earlier composite environments are significantly less effective in the more dense material. A significant issue resides in the difficulties of driving fasteners into very dense composite materials.

SUMMARY OF THE DISCLOSURE

In one embodiment, a fastener for composite or plastic lumber comprises a head having a socket rotatably couplable for application of a torque and having a recessed underside with a lower rim. An elongated shank extends from the head and terminates at a distal tip. The shank has an upper portion with an enlarged diameter and a lower portion with a reduced diameter. The upper portion is traversed by a left hand thread. The lower portion has a tri-lobed configuration and is traversed by a right hand thread with the right hand thread having a plurality of notches.

The right hand thread may extend substantially to the tip. At least one notch may be formed in the tip thread. In one embodiment, at least two notches are formed in the tip thread with at least two notches being out of phase. The notches form a spiral array. A land extends between the threads. The socket is preferably a square socket. The number of threads per inch of the left hand thread is less than the number of threads per inch of the right hand thread. The thread angle of the left hand thread is greater than the thread angle of the right hand thread. The left hand thread preferably has a minor diameter greater than the minor diameter of the right hand thread.

A screw which is especially adapted for securing trim board material comprises an elongated shank which extends from the head and terminates at a distal tip. A portion of the shank adjacent the head has an enlarged diameter which is traversed by a left hand thread. The lower shank portion has a reduced diameter which does not have a trilobial form but includes a right hand thread with a plurality of notches which extends substantially to the tip. The number of threads per inch of the left hand thread is less than the number of threads per inch of the right hand thread. The thread angle of the left hand thread is greater than the thread angle of the right hand thread. In one embodiment the screw has a length of approximately 2.75 inches and the left hand thread extends approximately 0.3 inches.

A screw which is especially adapted for securing extremely dense composite or plastic material comprises an elongated shank which extends from the head and terminates at a distal tip with an upper portion having an enlarged diameter and a lower portion of the shank having a reduced diameter. The upper portion is traversed by a plurality of rings having a uniform major diameter. The lower portion is traversed by a second thread with a plurality of notches. In one embodiment, there are three longitudinally spaced rings which are equidistantly spaced. The rings have an effective minor diameter greater than that of the second thread.

BRIEF DESCRIPTION OF THE DRAWINGS

FIG. 9 is an enlarged fragmentary view, partly in diagrammatic form, of a tip portion of the deck screw of FIG. 1;

FIG. 14 is a longitudinal view, partly in diagrammatic form, and partly in phantom, of a third stage workpiece for the deck screw of FIG. 1;

DETAILED DESCRIPTION

Figure 6:
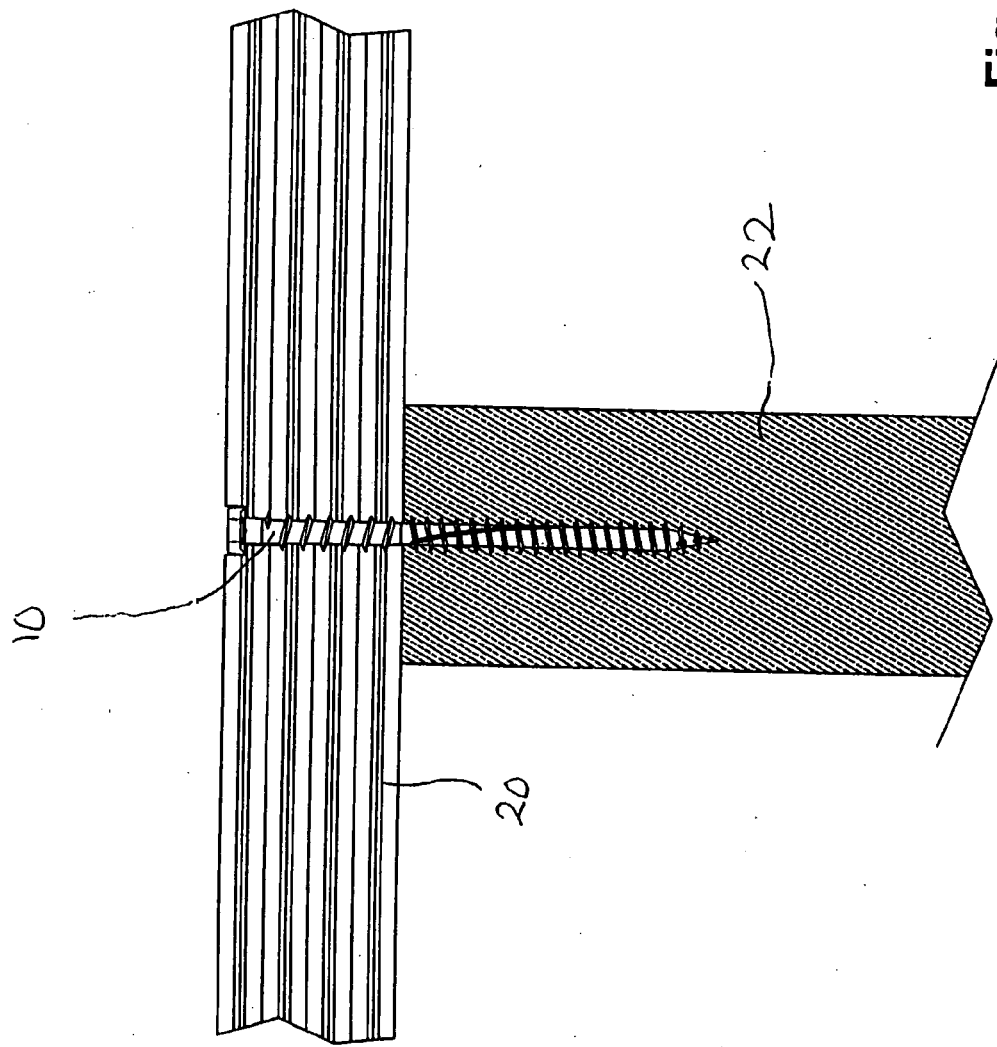
FIG. 6 is a sectional view illustrating the deck screw of FIG. 1 as employed for securing a composite material to a support structure.

With reference to the drawings wherein like numerals represent like parts throughout the several views, a deck screw is generally designated by the numeral 10. Deck screw 10 is especially adapted for securing elongated deck members 20 to a support member 22 wherein the composite material is a highly dense material such as, for example, Trex™ deck material, Timber Tech™ deck planks, etc. As illustrated in FIG. 6, the deck screw 10 functions to be driven through the composite member 20 into the support structure 22 to a depth wherein the head is below the upper surface of the material and forms a cylindrical counterbore above the head. The deck screw 10 can be driven without volcanoing or mushrooming of the material around the head and can be relatively easily driven without intense resistance to the application of torque during the driving process.

Figure 1:
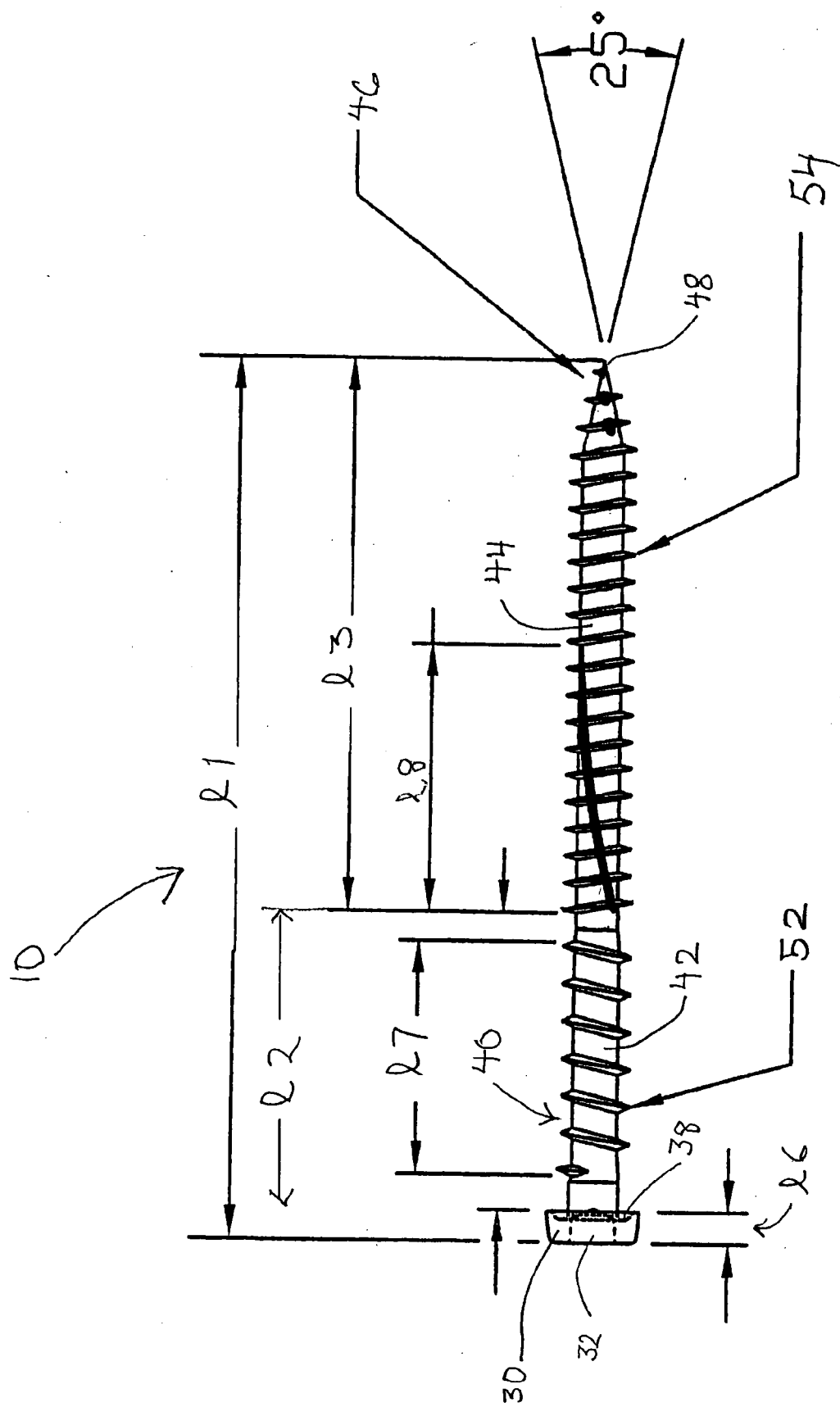
FIG. 1 is a longitudinal view, partly in phantom and partly in diagrammatic form, of a deck screw.

With reference to FIG. 1 the deck screw 10 includes a head 30 and an elongated shank 40 which extends from the head and has a generally bifurcated form. In one embodiment, the screw length l1 is 2.75 ins with a head diameter dl of 0.285 ins. The shank 40 has an upper portion 42 of length l2 of enlarged nominal diameter and a lower portion 44 of length l3 of reduced nominal diameter which has a distal tip 46. The tip terminates in a well-defined vertex point 48 which in the preferred form has a vertex angle of 25 degrees. The tip 46 functions as a drill point.

Figure 2:
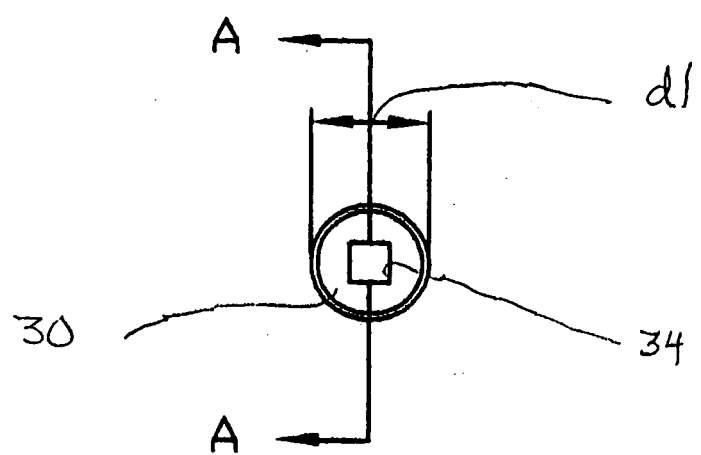
FIG. 2 is an end view of a head portion of the deck screw of FIG. 1.
Figure 3:
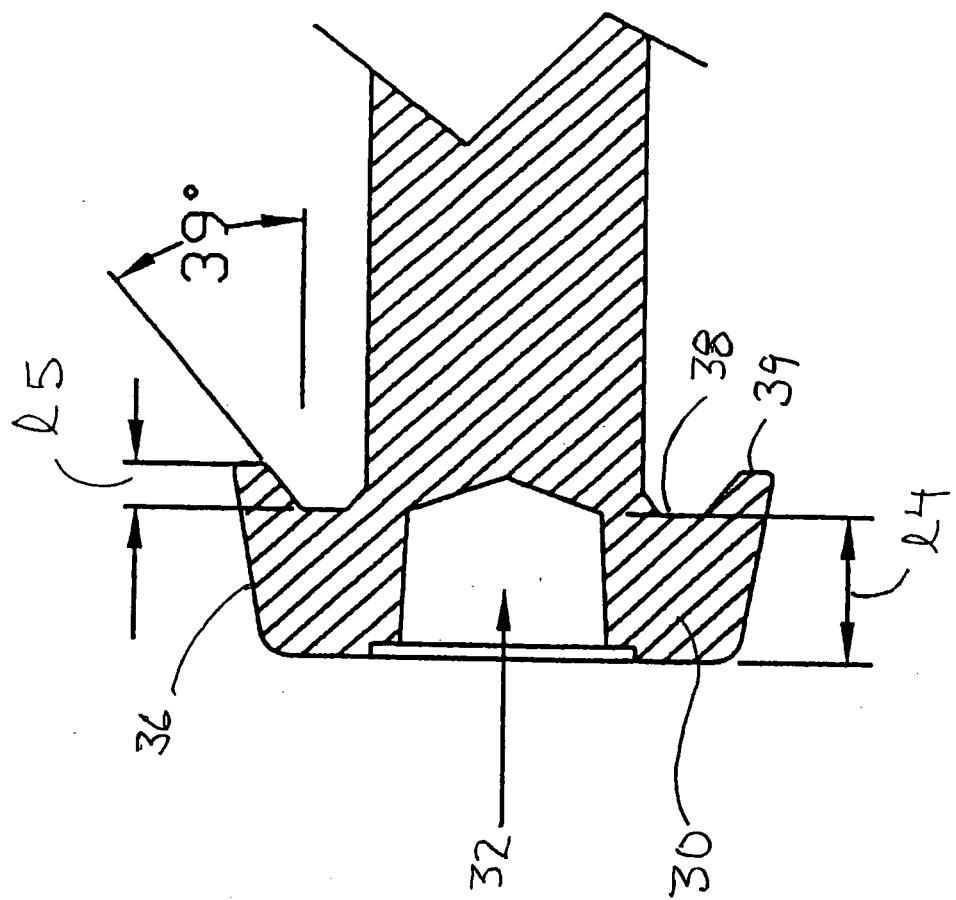
FIG. 3 is an enlarged sectional view, partly in diagrammatic form, of a head and end portion of the deck screw of FIG. 1 taken along the lines of A-A of FIG. 2.

With additional reference to FIGS. 2 and 3, the head 30 includes a recess 32 which at an upper portion is defined by a #1 square socket 34 and is adapted for coupling with a torque driver bit (not illustrated). Socket 34 preferably has a minimum depth of 0.075 ins and preferably a depth from 0.075 ins to 0.095 ins. If the socket depth is too shallow, the head will disengage during driving. If the head is too deep, the structural integrity of the head is jeopardized. The corners of the socket 34 may be rounded (not illustrated).

Figure 2A:
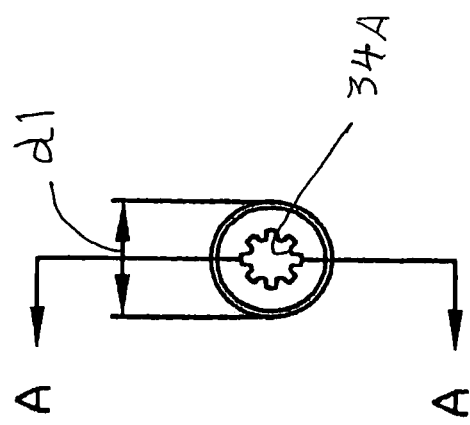
FIG. 2A is an end view of an alternative embodiment of a head portion of the deck screw of FIG. 1.

With reference to FIG. 2A, an alternative socket 34A is defined by 8 radial slots and is adapted for coupling with a torque driver (not illustrated). The coupling socket 34A may be similar in form and function to that described co-pending U.S. patent application Ser. No. 11/185,377 filed Jul. 20, 2005 which is assigned to the applicant of the present invention and the disclosure of which is incorporated by reference. The eight point torque driving engagement provides an efficient coupling engagement to facilitate torqueing of the deck screw and mitigate against disengagement of the tool during the driving process.

The head 30 includes a tapered skirt-like periphery 36 which includes a recessed underside 38 and a lower cutting rim 39. In one form, the angle of the underside flaring is on the order of 39 degrees as illustrated in FIG. 3. The head socket 34 is adapted to efficiently couple with the driver. The underside 38 of the head is configured to prevent composite material from being displaced past the head during the driving process and for capturing the composite material and trapping same at its underside. The cutting rim 39 is adapted to provide a clean, circular opening in the composite material and to present a pleased, finished setting of the deck screw in the drive bore so that the top surface of the head is below the surface of the dense composite material (FIG. 6).

Figure 4:
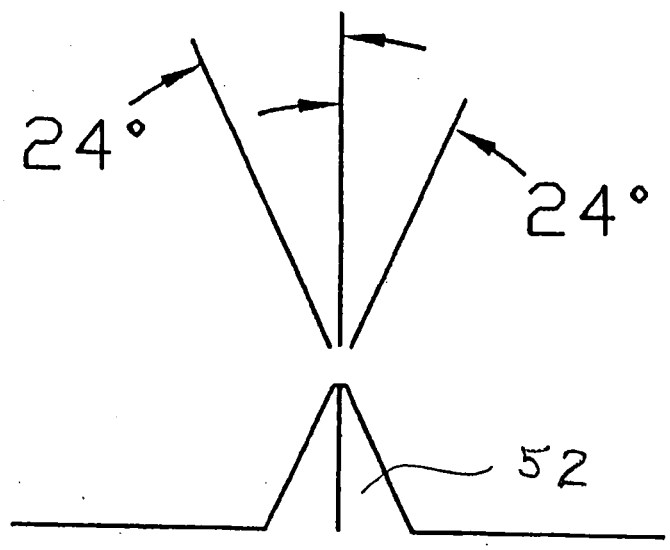
FIG. 4 is a diagrammatic view illustrating a representative thread profile for a top portion of the deck screw of FIG. 1.

The shank 40 has an upper portion 42 proximate the head which has a larger diameter than that of the lower portion 44. In one embodiment, the upper portion 42 includes a left hand thread 52 which extends a length l7 or approximately 0.750 inches and is 9 threads per inch. Thread 52 has a thread angle of 48 degrees as illustrated in FIG. 4. In a preferred embodiment of thread 52, the minor thread diameter is 0.133 inches and the major thread diameter is 0.210 inches.

Various approximate dimensions for one embodiment are summarized in Table I.

TABLE I

| d1 | 0.285 ins |
|----|-----------|
| l1 | 2.75 ins |
| l2 | 0.80 ins |
| l3 | 1.75 ins |
| l4 | 0.02 ins |
| l5 | 0.10 ins |
| l6 | 0.12 ins |
| l7 | 0.75 ins |

In another embodiment l7 is approximately 0.45 ins. and l3 is approximately 1.675 ins.

Figure 5:
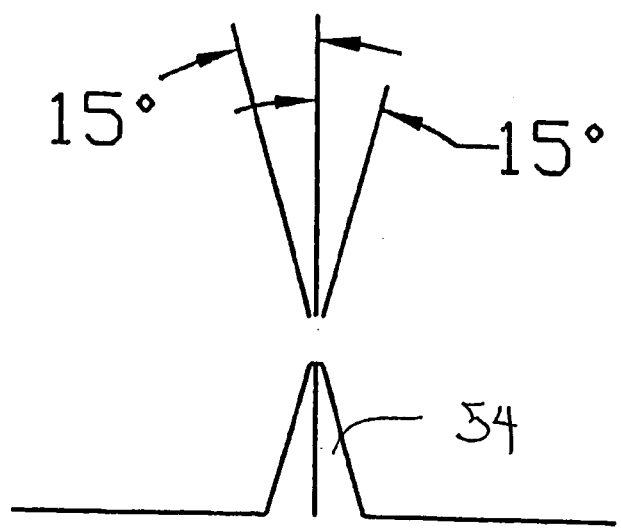
FIG. 5 is a diagrammatic view illustrating a representative thread profile for a bottom portion of the deck screw of FIG. 1.
Figure 15:
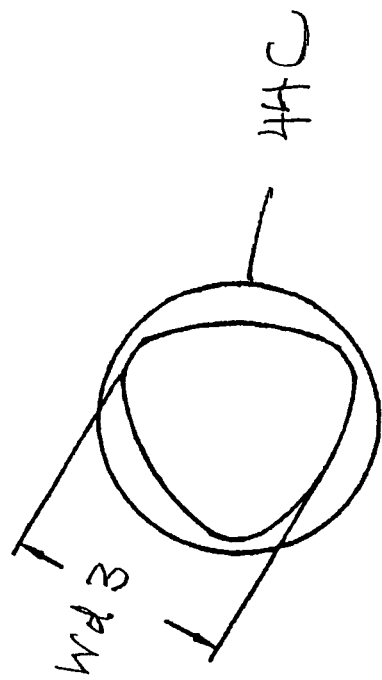
FIG. 15 is an enlarged sectional view, partly in phantom and partly in diagrammatic form, taken along the lines D-D of FIG. 14.
Figure 13:
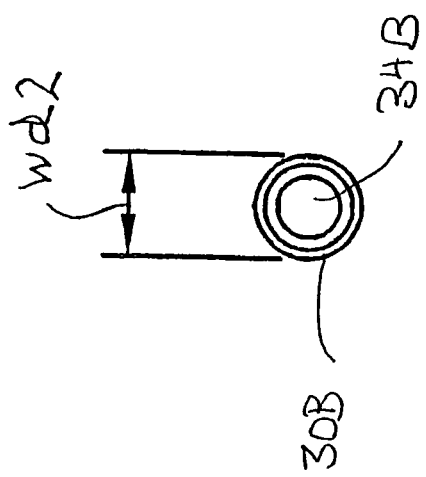
FIG. 13 is an end view of the workpiece of FIG. 12.

As will be further described, the lower shank portion 44 also has a tri-lobe configuration as best illustrated in FIG. 15. The lower shank portion 44 is traversed by a right hand thread 54 which is 12 threads per inch and has an included thread angle of 30 degrees as illustrated by the profile of FIG. 5. A preferred embodiment of thread 54 has a minor diameter md of 0.123 inches and a major diameter Md of 0.190 to 0.196 inches.

Figure 7:
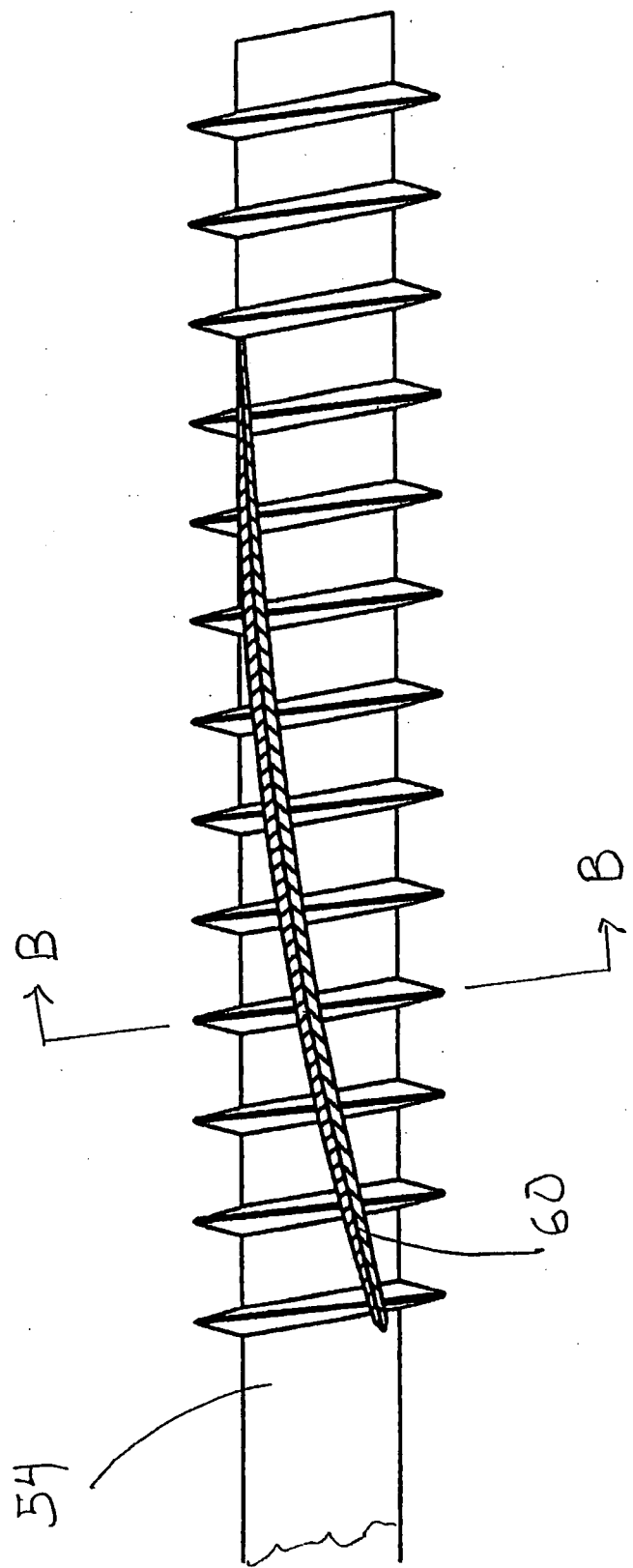
FIG. 7 is an enlarged longitudinal view of a medial portion of the deck screw of FIG. 1.
Figure 8:
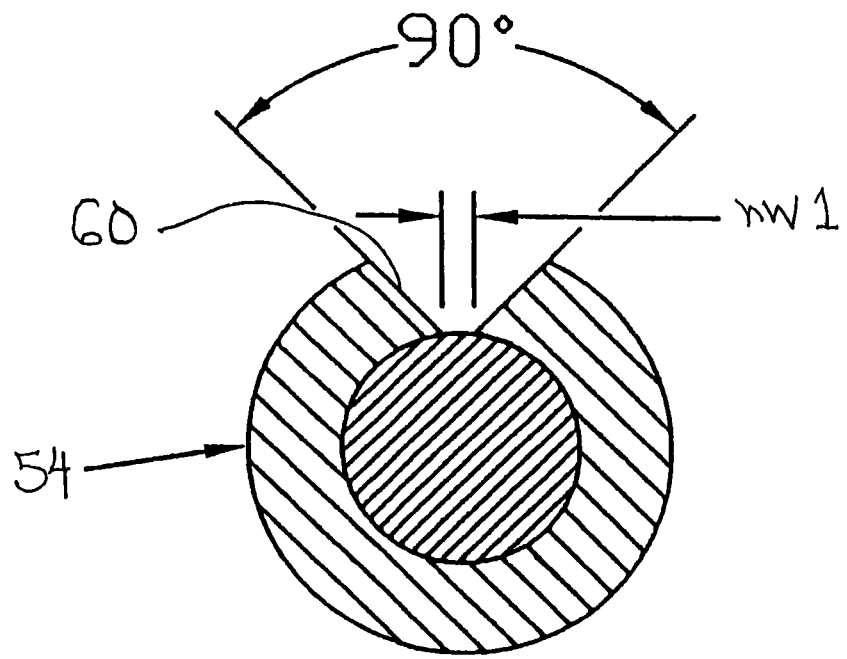
FIG. 8 is an enlarged cross-sectional view, partly in diagrammatic form, taken along the lines of B-B of FIG. 7 and rotated 90°.

With reference to FIGS. 1 and 7, the thread 54 for a length l8 of approximately 0.5 to 0.9 inches is traversed by a spiral array of notches 60. As best illustrated in FIG. 8, the spiral array 60 subtends an angle of approximately 90 degrees about the shank axis with the depth of each notch being approximately the minor diameter. The notch width nw1 is approximately 0.10 inches. The spiral array 60 extends approximately 1 revolution per 1.5 inches in length.

Figure 9A:
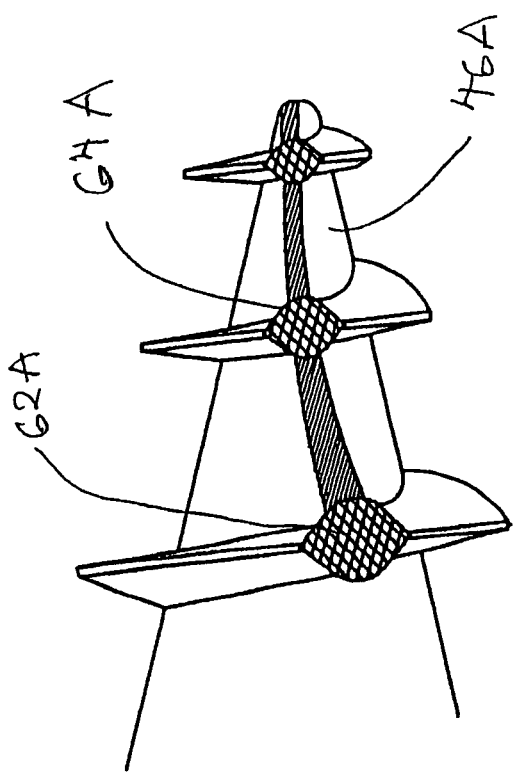
FIG. 9A is an enlarged fragmentary view, partly in diagrammatic form, of an alternative tip portion of the deck screw of FIG. 1.
Figure 10:
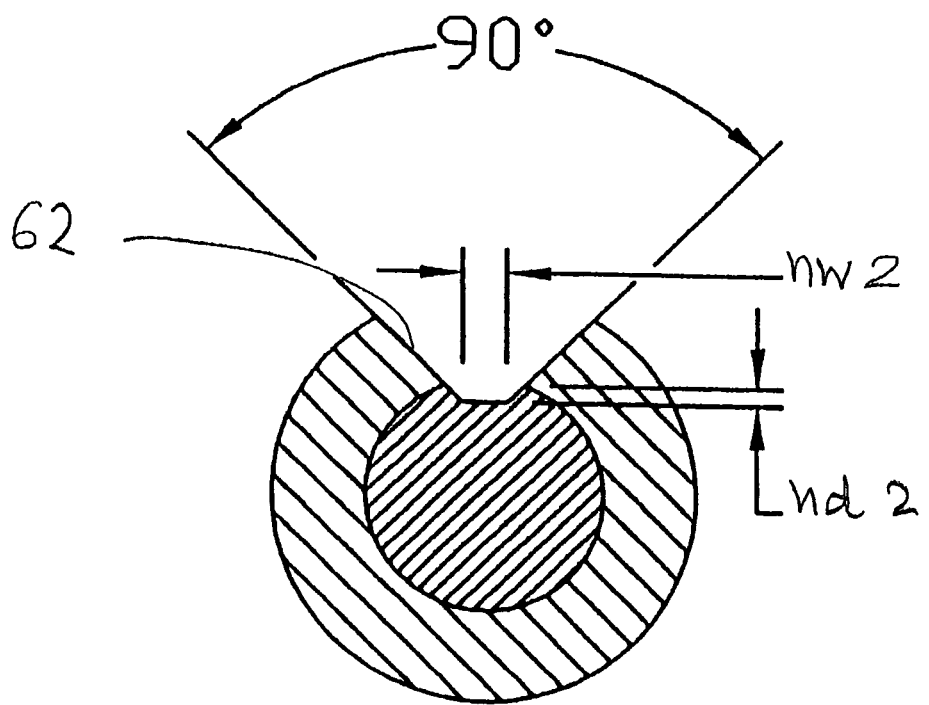
FIG. 10 is a sectional view, partly in diagrammatic form, taken along the lines of C-C of FIG. 9.
Figure 11:
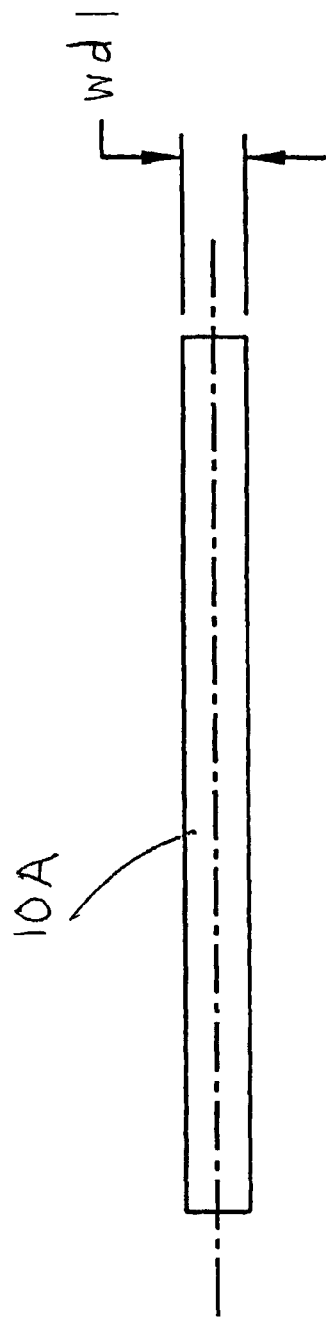
FIG. 11 is a longitudinal side view, partly in diagrammatic form, illustrating a first stage workpiece for the deck screw of FIG. 1.
Figure 12:
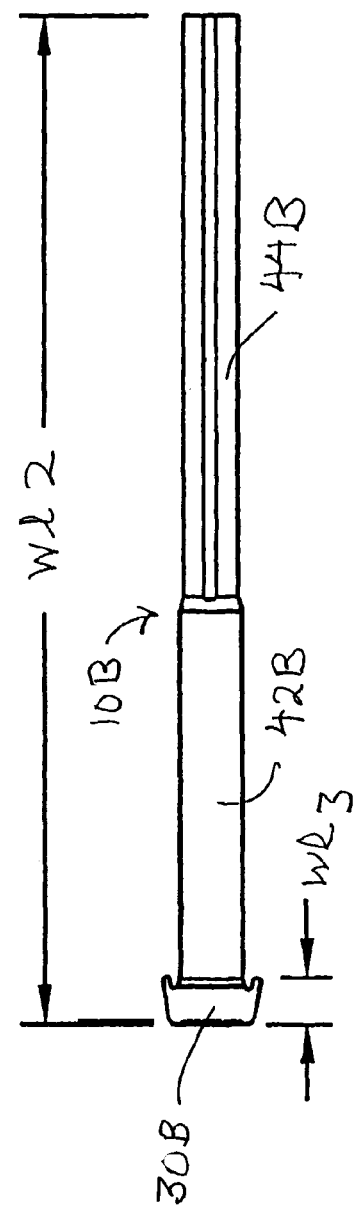
FIG. 12 is a longitudinal sectional view, partly in diagrammatic form, of a second stage workpiece for the deck screw of FIG. 1.

With reference to FIG. 9, the shank terminates in the tip 46 which continues the spiral thread 54. A notch 62 is shown in section. The width nw2 may be longer for notch 62. In some embodiments, only one notch may be employed for the tip. If two notches are employed, the second notch 64 is slightly out of phase to create a split point. The notches 62, 64 may extend to a depth slightly into the minor diameter at the tip as illustrated in FIG. 10. The depth wd2 of the notch is 0.12 inches. Another tip 46A having a blunt point with notches 62A and 64A is illustrated in FIG. 9A.

Representative dimensions for lower portion 44 for a preferred embodiment are set forth in Table II.

TABLE II

| l8 | 0.5 to 0.9 ins |
|----|----------------|
| nw1 | 0.10 ins |
| nd2 | 0.12 ins |
| md | 0.123 ins |
| Md | 0.190 to 0.196 ins |

The manufacturing process for the deck screw 10 is best illustrated in the FIGS. 11-15. The initial work piece cut off shown as 10A in FIG. 11 has a workpiece diameter wd1 of 0.15 ins and a workpiece length wl1 of 2.70 ins. The first blow shown in FIG. 12 produces workpiece 10B which forms the bifurcated shank portions 42B, 44B and the head 30B with workpiece lengths wl2 of 2.68 ins and wl3 of 0.125 ins and workpiece head diameter wd2 of 0.250 ins. The coupling recess 32 is then punched into the head portion to form the final head detail as shown in FIG. 3.

FIG. 14 shows the tri-lobe formed shank portion 44A for the workpiece 10C. The dimensions for workpieces 10A, 10B and 10C are given in Table III for a screw 10 having a final length l1 of 2.75 ins.

TABLE III

| | |
|---|---|
| l1 | 2.75 ins |
| Wd3 | 0.137 ins |
| wl1 | 2.70 ins |
| wd1 | 0.15 ins |
| wl2 | 2.68 ins |
| wd2 | 0.250 ins |
| wl3 | 0.125 ins |
| wl4 | 2.69 ins |
| wl5 | 1.715 ins |
| wl6 | 0.875 ins |
| wl7 | 0.115 ins |

The threads 52, 54 are then rolled onto the workpiece 10C. The notches 60 and 62 are then punched into the workpiece. Alternately, the notches may be formed during the thread forming process.

Figure 16:
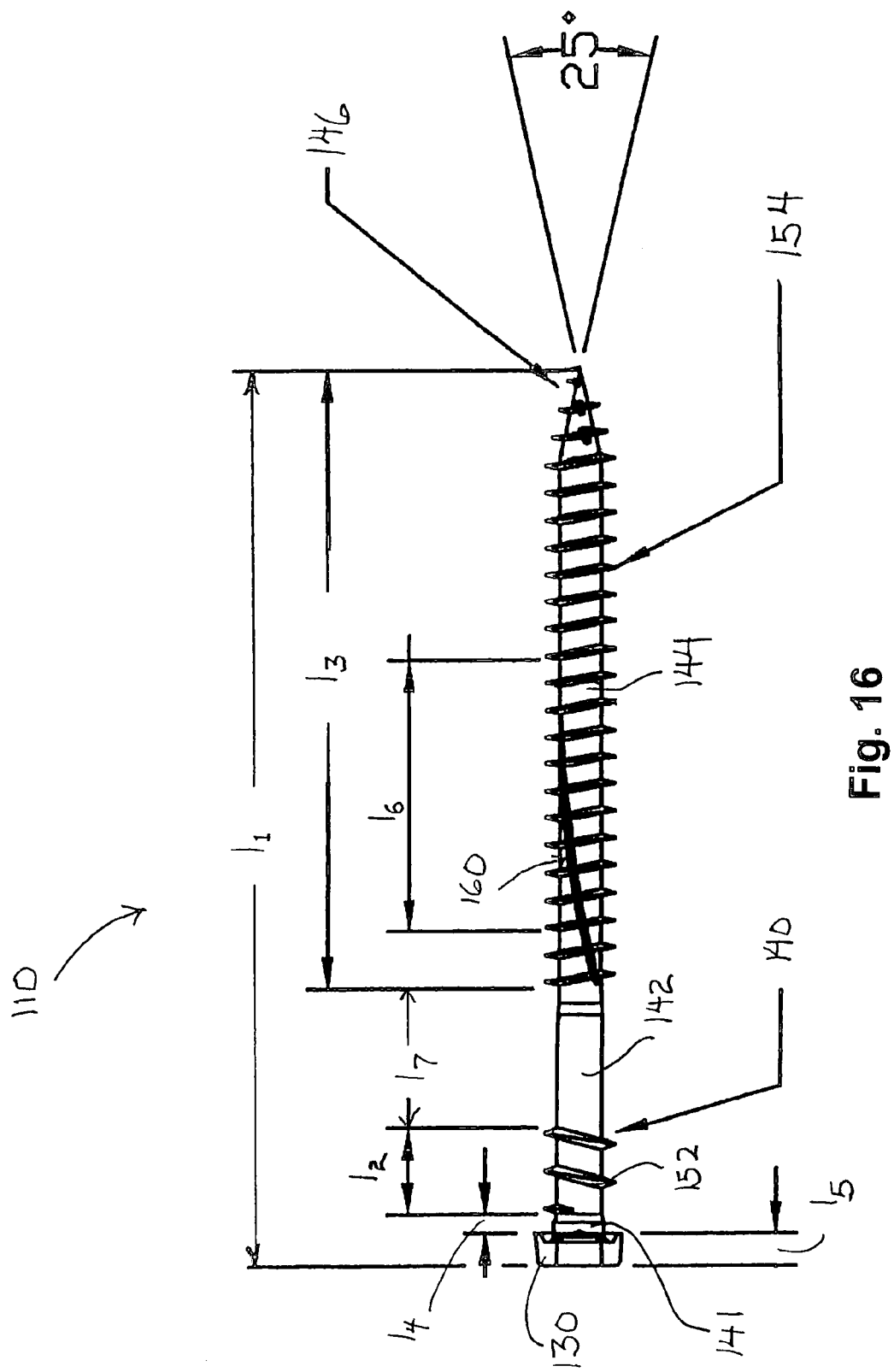
FIG. 16 is a longitudinal view, partly in phantom and partly in diagrammatic form, of another embodiment of a screw suitable for securing trim board.

With reference to FIG. 16, a screw which is especially adapted for securing trim board for composite or plastic materials is designated by the numeral 110. The trim board typically has a plastic composition. Screw 110 does not have a trilobial form as previously described with respect to deck screw 10. The screw 110 is efficiently configured to be driven through trim board of composite material into a composite member or a support structure. The screw 110 is preferably driven a depth in the trim board (not illustrated) wherein the head 130 is sunk below the upper surface of the material (not illustrated) and forms a cylindrical counter bore above the head. The screw can be driven without volcanoing or mushrooming of the material around the head and can be relatively easily driven without intense resistance to the application of torque during the driving process.

The head 130 is substantially identical in form and function to head 30. A representative embodiment of screw 110 is hereinafter described. The length of $l_1$ of one embodiment of the screw 110 is 2.750 ins. with the head diameter of 0.26 ins. The shank 140 has an enlarged diameter neck 141 and an extended portion 142. A lower portion 144 of length $l_3$ of 1.900 ins. with a distal tip 146 is substantially similar in form and function to tip 46. Portion 142 has a larger diameter than portion 144.

The portion 142 includes a left hand thread 152 which extends a length $l_2$ of approximately 0.300 ins. The thread 152 has 9 threads per inch with a 48 degree included angle, such as illustrated by the FIG. 4 profile. The thread 152 in one embodiment has a minor diameter of 0.133 ins. and a major thread diameter 0.250 ins.

The lower shank portion 144 is traversed by a right hand thread of 12 threads per inch and has an included thread angle of 30 degrees, as illustrated by the FIG. 5 profile. A preferred embodiment of thread 154 has a minor diameter of 0.123 ins. and a major diameter of 0.185 to 0.191 ins. The remaining portions are substantially similar to that described for deck screw 10 include a spiral array of notches 160 with notches in the tip being substantially the same as described with respect to deck screw 10.

Various approximate dimensions for one embodiment of trim screw 110 are summarized in Table IV.

TABLE IV

| | |
|---|---|
| $l_1$ | 2.750 ins |
| $l_2$ | 0.300 ins |
| $l_3$ | 1.900 ins |
| $l_4$ | 0.060 ins |
| $l_5$ | 0.105 ins |
| $l_6$ | 0.850 ins |
| $l_7$ | 0.375 ins |

Figure 17:
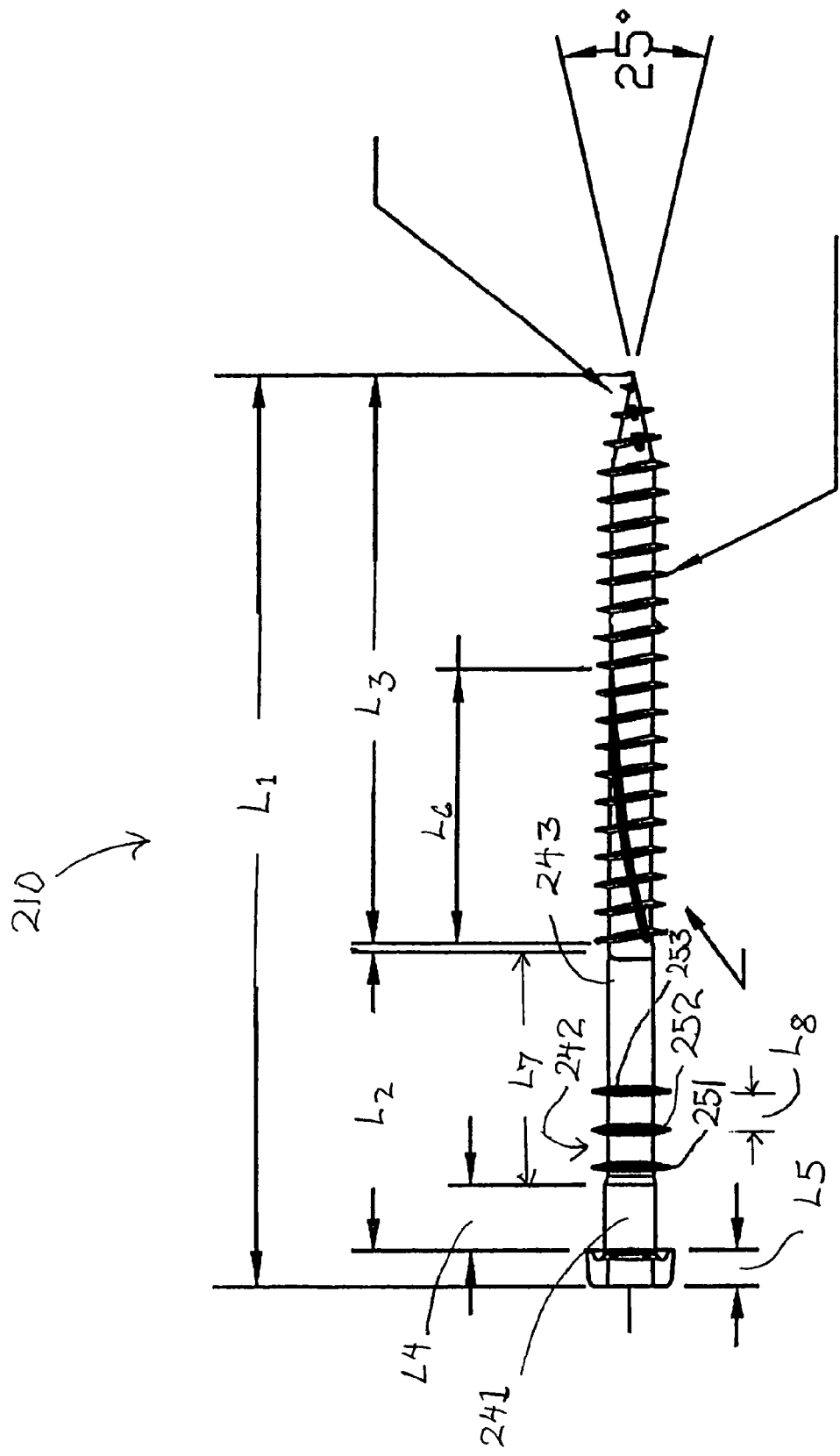
FIG. 17 is a longitudinal view, partly in phantom and partly in diagrammatic form, of yet another embodiment of a deck screw.

With reference to FIG. 17, deck screw 210 is especially adaptable for use with very dense material, such as, for example, Trex Escapes™ and EverGrain™ composite or plastic materials: A representative embodiment of deck screw 210 is hereinafter described. Deck screw 210, in one embodiment, has a length $L_1$ of 2.75 ins. and a head diameter of 0.26 ins. The upper portion 242 of the shaft includes an enlarged neck 241 which extends for a length of 0.20 inches and an adjacent shank portion 242 which extends a length $L_2$ for 0.900 ins.

Three rings 251, 252, 253 are formed on an intermediate shank portion 243. In one embodiment, the rings have an included angle of 30 degrees with an effective minor diameter of 0.133 ins. (the nominal diameter of portion 242) and a major diameter between 0.205 and 0.210 ins. The rings 251, 252, 253 are substantially identical and are spaced apart a pitch distance of approximately 0.121 ins.

The rings 252, 252, 253 have an included thread angle of 30°, such as illustrated in FIG. 5. The lower shank portion 244 is substantially identical to that of lower shank portion 154.

Various approximate dimensions for one embodiment of deck screw 210 are summarized in Table V.

TABLE V

| | |
|---|---|
| $L_1$ | 2.75 ins |
| $L_2$ | 0.900 ins |
| $L_3$ | 1.675 ins |
| $L_4$ | 0.200 ins |
| $L_5$ | 0.105 ins |
| $L_6$ | 0.900 ins |
| $L_7$ | 0.700 ins |
| $L_8$ | 0.121 ins |

While preferred embodiments have been set forth for purposes of illustration, the foregoing description should be deemed a limitation of the invention herein. Accordingly, various modifications, adaptations and alternatives may occur to one skilled in the art without departing from the spirit and the scope of the present invention.

What is claimed:

1. A fastener for composite or plastic material comprising:
    a head rotatably couplable for application of a torque and having a recessed underside and a lower cutting rim;
    an elongated shank extending from said head and terminating at a distal tip and comprising a neck portion having a uniform neck diameter adjacent said head and extending a neck distance, a first portion having a first diameter less than said neck diameter and a lower second portion having a reduced second diameter less than said first diameter;
    said first portion being traversed by a plurality of longitudinally spaced rings spaced a ring distance less than said neck distance; and
    said lower portion being traversed by a right-hand thread with a spiral array of notches, said right-hand thread having a pitch spacing less than that of said ring distance, said rings having an effective major diameter greater than that of said right hand thread.

2. The fastener of claim 1 wherein said right-hand thread extends substantially to said tip.

3. The fastener of claim 1 wherein there are three equidistantly spaced rings.

4. The fastener of claim 3 wherein the rings have the same major diameter.

5. The fastener of claim 1 wherein said right-hand thread extends from an upper point adjacent the upper end of said lower second portion downwardly toward said tip and said notches extend from said upper point downwardly toward said tip.

6. The fastener of claim 1 wherein each said ring defines a symmetrical included angle.

7. A fastener for composite or plastic material comprising:
a head having a socket rotatably couplable for application of a torque;
an elongated shank extending from said head and terminating at a distal tip and comprising a cylindrical neck having a uniform neck diameter, a first portion having a first diameter less than said neck diameter and a lower second portion having a reduced second diameter less than said first diameter;
said first portion being traversed by a plurality of rings having a uniform major diameter and a longitudinal spacing; and
said second portion being traversed by a thread, said thread having a pitch spacing less than the longitudinal spacing of said rings.

8. The fastener of claim 7 wherein said thread in said second portion extends substantially to said tip.

9. The fastener of claim 8 comprising at least one notch in said tip thread.

10. The fastener of claim 7 wherein said thread is a right hand thread, said thread having a major diameter less than the major diameters of said rings.

11. The fastener of claim 10 wherein there are three equidistantly spaced rings.

12. The fastener of claim 11 wherein said neck is disposed between said head and said first portion.

13. The fastener of claim 7 wherein each said ring defines a symmetrical included angle.

\* \* \* \* \*